(12) United States Patent
Levinson et al.

(10) Patent No.: US 8,878,938 B2
(45) Date of Patent: Nov. 4, 2014

(54) SYSTEM AND METHOD FOR ASSIGNING CAMERAS AND CODES TO GEOGRAPHIC LOCATIONS AND GENERATING SECURITY ALERTS USING MOBILE PHONES AND OTHER DEVICES

(75) Inventors: Lawrence Levinson, Roslyn, NY (US); Deepinder Singh, East Windsor, NY (US)

(73) Assignee: ZAP Group LLC, Cranbury, NJ (US)

( * ) Notice: Subject to any disclaimer, the term of this patent is extended or adjusted under 35 U.S.C. 154(b) by 289 days.

(21) Appl. No.: 13/451,089

(22) Filed: Apr. 19, 2012

(65) Prior Publication Data
US 2013/0002880 A1    Jan. 3, 2013

Related U.S. Application Data

(60) Provisional application No. 61/502,724, filed on Jun. 29, 2011.

(51) Int. Cl.
   *H04N 7/18*    (2006.01)
(52) U.S. Cl.
   CPC ...................................... *H04N 7/18* (2013.01)
   USPC .......................................... 348/159; 348/153
(58) Field of Classification Search
   None
   See application file for complete search history.

(56) References Cited

U.S. PATENT DOCUMENTS

| | | | |
|---|---|---|---|
| 5,648,770 A | 7/1997 | Ross | |
| 5,982,420 A | 11/1999 | Ratz | |
| 7,308,246 B2 | 12/2007 | Yamazaki et al. | |
| 7,444,588 B2 | 10/2008 | Hill et al. | |
| 7,451,401 B2 | 11/2008 | Tanskanen et al. | |
| 7,508,941 B1 | 3/2009 | O'Toole, Jr. et al. | |
| 7,843,491 B2 | 11/2010 | Vallone et al. | |
| 7,956,723 B2 | 6/2011 | Girgis et al. | |
| 8,149,109 B2 * | 4/2012 | Lontka ..................... 340/539.11 | |

(Continued)

FOREIGN PATENT DOCUMENTS

| | | |
|---|---|---|
| RU | 2 018 867 C1 | 8/1994 |
| RU | 2 196 358 C2 | 1/2003 |
| RU | 36 315 U1 | 3/2004 |

OTHER PUBLICATIONS

United States Office Action dated Jun. 27, 2012 from related U.S. Appl. No. 13/451,200.

(Continued)

*Primary Examiner* — Mehrdad Dastouri
*Assistant Examiner* — James Anderson, II
(74) *Attorney, Agent, or Firm* — Scully, Scott, Murphy & Presser, PC

(57) ABSTRACT

A system and method for generating security alerts for a facility is presented. The system can comprise a server, cameras operable to stream video to the server or other storage location and to a surveillance center of the facility, input devices, a first module operable to assign one or more codes to the facility, associate one or more cameras with each code, and associate response guidelines with each code; and a second module operable to receive one code of the one or more codes from one of the one or more input devices, notify the facility assigned to the one code based on the response guidelines, stream video from the one or more cameras associated with the one code to the surveillance center of the facility, and generate the security alert based on the video stream. In one aspect, a user can send a video feed along with the code.

27 Claims, 13 Drawing Sheets

(56) References Cited

U.S. PATENT DOCUMENTS

| | | |
|---|---|---|
| 2003/0098869 A1 | 5/2003 | Arnold et al. |
| 2003/0169185 A1 | 9/2003 | Taylor |
| 2005/0097135 A1 | 5/2005 | Epperson et al. |
| 2006/0000971 A1 | 1/2006 | Jones et al. |
| 2006/0276200 A1 | 12/2006 | Radhakrishnan et al. |
| 2008/0216139 A1 | 9/2008 | Liwerant et al. |
| 2008/0304628 A1 | 12/2008 | Rowe et al. |
| 2008/0320538 A1 | 12/2008 | Liwerant |
| 2009/0044237 A1 | 2/2009 | Keiter |
| 2009/0150947 A1 | 6/2009 | Soderstrom |
| 2009/0284348 A1 | 11/2009 | Pfeffer |
| 2009/0300498 A1 | 12/2009 | Falchuk |
| 2009/0300530 A1 | 12/2009 | Falchuk |
| 2010/0099461 A1* | 4/2010 | Rahfaldt et al. ............... 455/557 |
| 2010/0229121 A1 | 9/2010 | Falchuk |
| 2010/0279649 A1 | 11/2010 | Thomas |
| 2011/0090334 A1* | 4/2011 | Hicks et al. ................... 348/143 |
| 2011/0099372 A1 | 4/2011 | Annapureddy et al. |
| 2011/0107220 A1 | 5/2011 | Perlman |
| 2011/0111728 A1 | 5/2011 | Ferguson et al. |
| 2011/0130112 A1 | 6/2011 | Saigh et al. |
| 2011/0230161 A1* | 9/2011 | Newman .................... 455/404.1 |
| 2012/0016952 A1 | 1/2012 | Watt |
| 2012/0052837 A1 | 3/2012 | Reich et al. |

OTHER PUBLICATIONS

United States Office Action dated Jul. 25, 2012 from related U.S. Appl. No. 13/451,162.
International Search Report together with the Written Opinion dated Sep. 20, 2012 from related application PCT/US 2012/042599.
United States Office Action dated Jan. 17, 2003 from related U.S. Appl. No. 13/451,200.
United States Office Action dated Nov. 21, 2012 from related U.S. Appl. No. 13/451,162.
International Search Report together with the Written Opinion dated Nov. 29, 2012 from related application PCT/US 2012/042595.
International Search Report together with the Written Opinion dated Oct. 18, 2012 from related application PCT/US 2012/042598.
U.S. Office Action dated Aug. 27, 2014 received in related U.S. Patent Application, namely U.S. Appl. No. 13/451,200.

* cited by examiner

SYSTEM AND METHOD FOR ASSIGNING CAMERAS AND CODES TO GEOGRAPHIC LOCATIONS AND GENERATING SECURITY ALERTS USING MOBILE PHONES AND OTHER DEVICES

CROSS REFERENCE TO RELATED APPLICATIONS

The present invention claims the benefit of U.S. provisional patent application 61/502,724 filed Jun. 29, 2011, the entire contents and disclosure of which are incorporated herein by reference as if fully set forth herein.

This application is related to commonly-owned, co-pending United States Patent, and commonly-owned, co-pending U.S. patent application Ser. No. (13/451,162) for SYSTEM AND METHOD FOR REPORTING AND TRACKING INCIDENTS WITH A MOBILE DEVICE and U.S. patent application Ser. No. (13/451,200) for SYSTEM AND METHOD FOR REAL TIME VIDEO STREAMING FROM A MOBILE DEVICE OR OTHER SOURCES THROUGH A SERVER TO A DESIGNATED GROUP AND TO ENABLE RESPONSES FROM THOSE RECIPIENTS, both filed on even date herewith, the entire contents and disclosure of which is expressly incorporated by reference herein as if fully set forth herein.

FIELD OF THE INVENTION

This invention relates generally to incident reporting using assigned codes in a particular location.

BACKGROUND OF THE INVENTION

Camera surveillance is in use at many locations in the United States and internationally. The surveillance facilities generally depend upon their surveillance personnel to recognize a situation from video camera feeds and report it to the authorities. However, there are limits to how many cameras a human can be looking at and there are limits to the attention span of an individual looking at the cameras. There are also typically limits to the facility's surveillance system as the surveillance guard who is looking at the feeds cannot share those camera feeds with the first responders in the facility or with a 911 system.

Accordingly, there is a need for a system and method to make camera and/or video surveillance easier for surveillance personnel to recognize a situation and share camera feeds with others including both internal and external emergency responders and personnel.

SUMMARY OF THE INVENTION

An inventive solution to the above identified problems is presented. A system and method is presented for assigning codes to geographic boundaries, e.g., locations, and installing and associating cameras within these boundaries to the assigned codes. Feeds from these cameras are available to surveillance guards, typically via the Internet, using novel software in accordance with the invention. When an incident occurs in a particular location, for example a bank branch, a section of an airport, a lab in a university, etc., anyone can report the incident. In one aspect, the reporting can be done by using a mobile device equipped with an inventive software application and entering the assigned code of the particular location. Alternative methods of reporting an incident can also be used. This incident report is received by the inventive server and then routed to the computer(s) and/or cameras and/or monitors of the surveillance personnel associated with the particular location. The surveillance personnel can then focus on the camera feeds from the cameras associated with the code provided by the server and can take appropriate actions. The ZAP CODE system assigns codes to locations which are too close together for standard global positioning systems to pinpoint.

In accordance with the present invention, the camera feeds are provided as video feeds to the surveillance personnel monitoring various locations in a facility. In the event of an incident, the video feeds can also be shared with the law enforcement agencies or internal security personnel in the facility based on the severity of the situation.

A computer readable storage medium storing a program of instructions executable by a machine to perform one or more methods described herein also may be provided.

TERMINOLOGY

ALERT: A user sends a message, typically a ZAP CODE, to the ZAP SERVER about an incident at the location associated with the ZAP CODE.

ALERT TIME: This is the time at which an alert was received by the ZAP SERVER. The video feeds from the cameras can be accessed based on the timestamps according to the alert time, that is, the time the alert was received.

DISPATCHER: Person, typically a 911 operator, who receives a distress call and/or a person deemed to receive distress calls. Alternatively, the dispatcher is a centralized office to handle dispatch and response to incidents. In case of a crime situation the ZAP SYSTEM enables the video feeds of the ZAP CODE CAMERAS to be forwarded to the DISPATCHER.

FIRST RESPONDER: These are police, fire, EMT, Hazmat, SWAT, Anti Terrorism, Bomb Squad or any other agency, body or group, private or government owned, and/or other service providers who respond to 911 and/or distress emergencies. If the DISPATCHER deems the incident as something that needs input and/or assistance from the FIRST RESPONDERS, then the video feed from the ZAP CODE CAMERAS can be sent to the FIRST RESPONDERS.

INFORMATION: Information, such as video, audio, text, images and/or other data, which is communicated between system components. Generally information is the exchange of audio, video, image and/or text data between the parties involved in responding to a particular incident. All of the information is stored on a ZAP SERVER for the particular incident.

INTERNAL RESPONDER: A ZAP FACILITY may have its own internal security, that is, security officers such as airport security personnel, university campus police, bank security guards, etc. These internal security personnel, e.g., Internal Responders, perform first responder-type functions for the ZAP FACILITY. The internal security personnel may be the employees of the ZAP FACILITY or they may be outsourced to third party security firms.

INTERNAL SURVEILLANCE CENTER: A ZAP FACILITY may have its own internal surveillance center, that is, one or more physical locations containing surveillance equipment including cameras, monitors, etc., for viewing camera and/or video feeds received from cameras throughout the ZAP FACILITY. Surveillance personnel typically work in the internal surveillance center and examine the video feeds for incidents and/or other issues. These surveillance personnel may be the employees of the ZAP FACILITY or the surveillance personnel functions may be outsourced to third party security firm. The surveillance center for a ZAP FACILITY may also be located off-site and operated by either the owner of the ZAP FACILITY or a third party security firm. The surveillance center is sometimes known as a command and control center.

MOBILE DEVICES: These are devices, typically hardware, that can send alerts and/or information via the internet or 2G/3G/4G or any other cellular networks to the ZAP SERVER. Examples of these types of devices can be an iPhone, iPad, Android®-based smartphones, Android® Notebook, Chrome book, Amazon® Kindle®, Blackberry® phones, tablet computers, laptop computers, or any other mobile device on which the ZAPAPP can be installed. These devices are not limited to any specific type of hardware or vendor or operating system, but will operate with any device generally considered to be a mobile device, that can connect to a network, transmit information to a server and receive information from a server. Typically, only software is provided to be installed on the mobile device, and the hardware is owned by the user.

OPERATOR: Person, located in the Internal Surveillance Center, who is reviewing and responding to alerts received at the Internal Surveillance Center.

PARTIES: The people involved in an incident are the parties in the incident. These can be INTERNAL SURVEILLANCE CENTER personnel, INTERNAL RESPONDERS, DISPATCHER, FIRST RESPONDERS and, optionally, a user who is involved only if he makes a streamed video call along with the messaging of the ALERT.

RESPONSE GUIDELINES: Procedures determined by a ZAP FACILITY and/or licensee of ZAP CODE regarding how to respond to the various types of alerts received from the ZAP SERVER.

TIMESTAMPING: The ZAP SYSTEM timestamps the video feeds from the ZAP CAMERAS, enabling a specific point in time to be accessed from the video feed(s).

USER: Anyone who has the "ZAPAPP" on his or her mobile device is a user.

VIDEO CALL: A user who uses ZAPAPP can report the incident by keying in the ZAP CODE of the facility and sending the ZAP CODE to the ZAP SERVER by pressing the "Send Alert" button on ZAPAPP. In addition to sending the alert, the user also has the ability to use ZAPAPP to send additional information, such as video, images, voice and text-based data, from the situation to the ZAP SERVER.

ZAP911: Inventive hardware/software application described in detail in commonly-owned U.S. patent application Ser. No. (13/451,162), "SYSTEM AND METHOD FOR REPORTING AND TRACKING INCIDENTS WITH A MOBILE DEVICE" (hereinafter "U.S. App (13/451,162)") for enhancing people's personal safety. Mobile devices are used to report and/or record both "911" type situations and non-emergency situations and report incidents and/or situations. Users of ZAP911 can record, transmit, stream, upload and/or send information from a threatening situation to a dispatcher at an emergency management office or facility and to the user's safety group. The dispatcher can assess the situation and, if the situation warrants action, then the information can be forwarded to the appropriate first responders. The system geo-locates the user and allows integration of camera feeds in the user's vicinity. The ZAP911 inventive system and method enables a user to contact a dispatcher and also to alert the user's safety group. Four pieces of software facilitate video, audio, images and/or text medium of communication between the user-in-distress and the dispatcher, first responder and/ the user's safety group ZAPAPP: Inventive hardware/software application that runs on ZAP SERVER and, among other things, enables a user to report a situation to the server using a mobile device.

ZAP CAMERA: A camera installed by ZAP or one that is accessible to the ZAP SYSTEM.

ZAP CODE: This is a code assigned to a geographic location within a ZAP FACILITY. This is an alphanumeric combination to uniquely identify a location in the ZAP SYSTEM. Examples of this may be a ZAP CODE of 8T55 assigned to a particular bank branch in Manhattan, a ZAP CODE of U777 assigned to the chemistry lab in a university, a ZAP CODE of 44Y6 assigned to the check-in area of an airport, and a ZAP CODE of 6H90 assigned to the bar in a ship. Each ZAP FACILITY might have an overall facility ZAP CODE, such as 912 instead of 911.

ZAP CODE CAMERAS: Each ZAP CODE is associated with a ZAP CODE CAMERA. One ZAP CODE can be associated with more than one ZAP CODE CAMERA. For example, if there are six cameras in a bank branch, then these six cameras could be the ZAP CODE CAMERAS associated with ZAP CODE 8T55. When an alert is received from this location, e.g., an alert of 8T55 is sent to ZAP SERVER, the Internal Surveillance Center can focus on these six cameras at this bank branch. The video feeds from all of the bank branch's cameras are available at all times at the internal surveillance center, and when an alert with ZAP CODE is received, the internal surveillance center personnel can focus their attention on the ZAP CODE CAMERAS associated with the ZAP CODE.

ZAP FACILITY: A facility that is protected by ZAP is a ZAP FACILITY, that is a facility, e.g., airport or transportation terminal, university, medical center, shopping mall, military base, corporate office park, etc., that has licensed the ZAP SYSTEM. A ZAP FACILITY can be any facility that has camera feeds that are accessible by ZAP SERVER and are associated with one or more ZAP CODES assigned to ZAP CODE CAMERAS in the facility. A ZAP FACILITY is not limited to an entity having only one physical location; instead, a ZAP FACILITY can include a bank that has multiple branches, a school district with multiple buildings, a retail chain of multiple stores, etc.

ZAP PROTECTED COUNTY: A County where the appropriate governmental agency has licensed the ZAP911 system and it has been implemented. This would include providing the dispatchers in the county with ZAP DISPATCH software and the FIRST RESPONDERS in the county with the FIRST RESPONDER software/hardware.

Non-ZAP PROTECTED COUNTY: A county where the ZAP911 System has not been implemented.

ZAP SERVER: Hardware and/or software which manages the ZAP SYSTEM including all communications among the user, the dispatcher, the first responders, the internal surveillance center and the internal responders. ZAP SERVER receives and processes alerts and maintains databases, such as a database of ZAP CODES associating ZAP CODES with ZAP CODE CAMERAS, a database of geo-locations, etc. ZAP SERVER hardware can include a CPU.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

A novel system and method for generating security alerts based on input of a code denoting a particular, pre-assigned location and accessing camera feeds associated with that location is presented. The novel system and method enhances the surveillance of a geographic area by giving people the ability to report incidents in that area via an associated code. The incident can be reported using a remote device such as a telephone, a mobile device, a portable computer, a specialized device, or any other device that can perform the incident reporting functionality as described herein. The incident can be reported by a user calling a telephone number, such as a toll free number, and reciting the ZAP CODE, either by keying it or by speaking it or any other method. Alternatively, a user can call a predetermined telephone number which automatically indicates the ZAP CODE. In another aspect, the user executes ZAPAPP on his or her mobile device and provides the ZAP CODE via ZAPAPP. In this aspect, the user can also provide information, such as video, audio, text, data, etc., to the ZAP SERVER. In yet another aspect, a specialized device that can trigger alerts remotely can be used. The invention can be deployed in an airport, a mall, a university, a corporate office park, hospital, military base and/or any other facility that has a defined boundary. In addition, the invention can be deployed by an organization, such as a bank, school district or retail chain, that has multiple locations and/or multiple defined boundaries.

The inventive system and method ties camera feeds from the geographic area to the code assigned to the area. The ZAP CODES within a facility are visibly posted so that users can easily read them and use them in emergency situations. Once an alert with a code is reported, the internal surveillance center monitoring the geographic area is notified of exactly what cameras to focus on to provide a better view of the incident.

The invention is centered around six pieces of software: ZAPAPP, ZAP SERVER, ZAP INTERNAL SURVEILLANCE CENTER, ZAP INTERNAL RESPONDERS, ZAP DISPATCH and ZAP FIRST RESPONDERS. These pieces work together to facilitate an end to end video, audio, image and text medium of communication to intercept, assess and/or resolve the incident.

Figure 1:
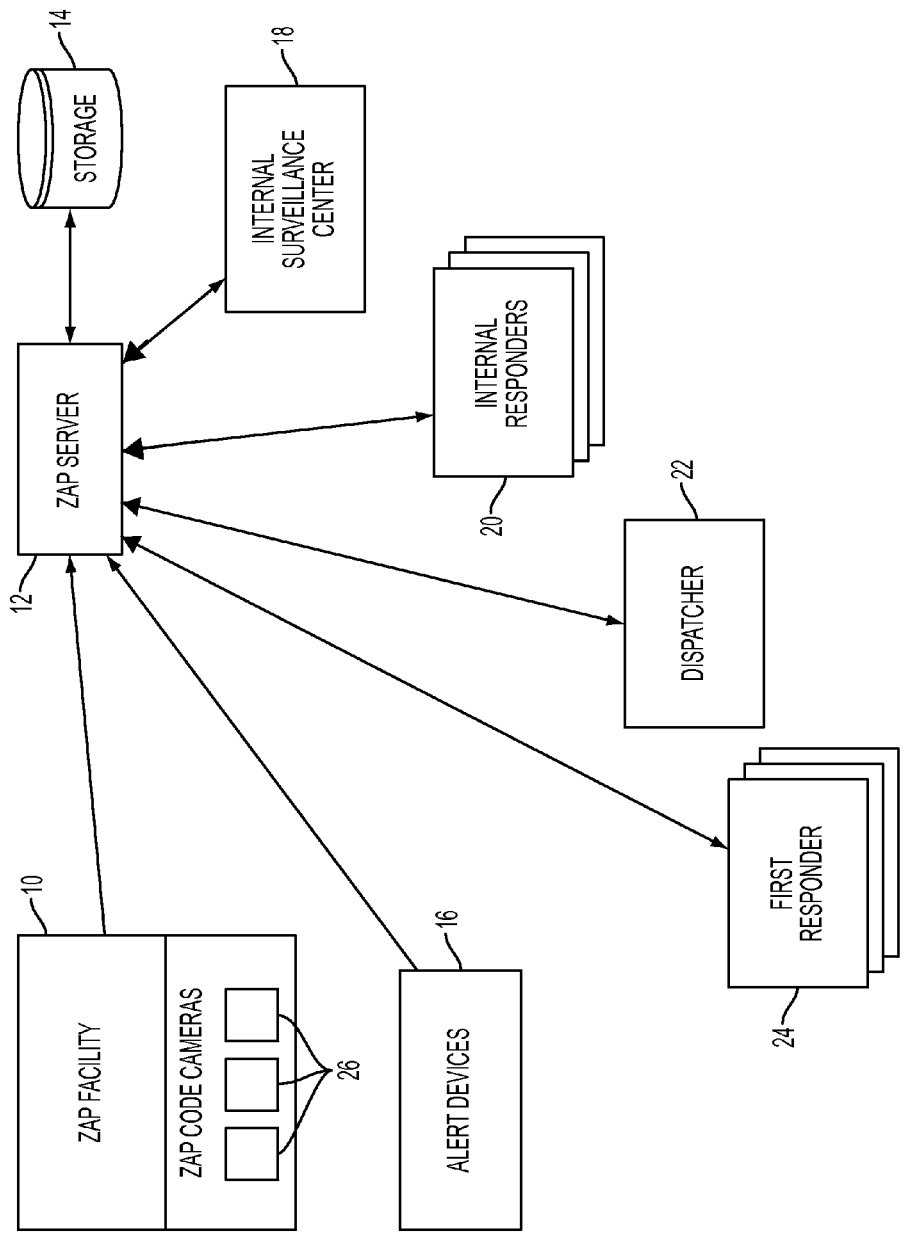
FIG. 1 shows the overall schema of the workflow of the inventive system and method.

FIG. 1 shows the components of the inventive system in an exemplary embodiment in which ZAP PROTECTED COUNTY exists. As shown in FIG. 1, the system can include a ZAP FACILITY 10, a ZAP SERVER 12, SERVER STORAGE DEVICE(s) 14, ALERT DEVICES 16, INTERNAL SURVEILLANCE CENTER 18, INTERNAL RESPONDER 20, DISPATCHER 22, FIRST RESPONDER 24 and ZAP CODE CAMERAS 26. In one embodiment, camera feeds and video storage are provided via the ZAP SERVER. In another embodiment, the ZAP FACILITY manages its own feeds and storage.

The ZAP CODE CAMERAS' locations are maintained in a database in the ZAP SERVER so that the ZAP CODE CAMERAS within the vicinity of an incident can be located and their video feeds made accessible to the internal surveillance center and internal responders. When an incident occurs in the ZAP FACILITY, an alert can be sent to the ZAP SERVER from any of the ALERT DEVICES. For example, an alert can be sent via a mobile device using ZAPAPP via HTTP protocol using the internet or any of the cellular networks available. In another embodiment, an alert can be sent to the ZAP SERVER via a traditional telephone call to a toll free number using cellular networks and/or a telephone exchange network. In yet another embodiment, an alert can be sent to the server via a specialized security device via the internet using HTTP protocol.

In one embodiment, if the user is using a mobile device equipped with the ZAPAPP, he or she can also send a video feed along with the alert being sent to the ZAP SERVER. In this scenario, the ZAP SERVER adds the video feed received from the mobile device of the user as an additional feed along with all the other feeds from the appropriate ZAP CODE CAMERAS and makes all of these video feeds available to the internal surveillance center and/or the dispatcher, if appropriate. The ZAP CODE CAMERAS only provide video feeds. Advantageously, if the user is streaming video from his mobile device then audio is also available to the internal responder and/or the dispatcher. This embodiment also allows for the internal surveillance center to talk via audio or chat via text to the user who is uploading the video. This communication can be made via HTTP, SMS, RTMP, RTSP, FTP protocols over the internet or the cellular networks available.

Once an alert is received, the ZAP SERVER recognizes and/or extracts the ZAP CODE associated with the alert and routes the alert according to the RESPONSE GUIDELINES of the ZAP FACILITY associated with the ZAP CODE. As an example, in case of a large facility having an internal surveillance center, for example a university, an airport, a banking organization, etc., the alert would be routed to the internal surveillance center of the ZAP FACILITY. When no internal surveillance center exists, for example in a convenience store and/or when the Response Guidelines specify, the alert would be routed directly to the dispatcher along with the address of the location.

The INTERNAL SURVEILLANCE SOFTWARE is novel software licensed to a ZAP FACILITY. This software can reside on one or more computers used by the internal surveillance center. Alternatively, the software can be accessed via a web site and/or through the Cloud. Regardless of its location, the software is capable of receiving alerts from ZAP SERVER. Easy access to the ZAP CODE CAMERAS that correspond to the ZAP CODE obtained from the alert is provided by the Internal Surveillance software.

The Internal Surveillance Center receives an alert from the ZAP SERVER for the ZAP FACILITY associated with the ZAP CODE. In response to this alert, the INTERNAL SURVEILLANCE CENTER can view the feeds from the cameras attached to the ZAP CODE, e.g., the ZAP CODE CAMERAS. The Internal Surveillance Center personnel can also go back in time through the video feeds and view the incident from the beginning and from various cameras at different angles and positions, depending on the options available.

If a threat is perceived in the video feeds, then in accordance with the protocols of the Response Guidelines given to the Internal Surveillance Center by ZAP FACILITY, the alert can be sent to the INTERNAL RESPONDERS and/or to the DISPATCHER. When sending the alert, the INTERNAL SURVEILLANCE CENTER may extract a clip from one of the video feeds of the ZAP CODE CAMERAS and attach this clip to the incident. This recognizes that an incident that occurs in the ZAP FACILITY may be time sensitive and the INTERNAL SURVEILLANCE CENTER, instead of providing a video feed to the INTERNAL RESPONDERS may choose to extract a very short clip, for example, ten seconds, that show the situation to the Internal Responders, to save time and improve response time from these responders. The same applies if the alert is sent to the DISPATCHER, who can also be given a live feed from any of the ZAP CODE CAMERAS.

The ZAP INTERNAL RESPONDER SOFTWARE is software that is licensed to the ZAP FACILITY for provision to the INTERNAL RESPONDERS of the facility. It is software that is created for mobile devices and for laptop computers. This software allows the INTERNAL RESPONDERS to receive alerts from the INTERNAL SURVEILLANCE CENTER about an incident in their ZAP FACILITY. An example of an Internal Responder may be a campus police officer in a university who is patrolling the facility, a bank guard who is patrolling a branch of a bank, and/or a private security guard patrolling a shopping mall. ZAP INTERNAL RESPONDER software can produce an audio visual message as an alert. When the INTERNAL RESPONDER clicks on this alert, he can see the video feeds associated with the ZAP CODE from where the incident is reported. If the INTERNAL SURVEILLANCE CENTER has attached any video clips to the report of the incident, then those video clips can be seen as well. The software also allows the INTERNAL RESPONDER to exchange audio information with the INTERNAL SURVEILLANCE CENTER. In one embodiment in which the user who reports the incident is also streaming live video of the incident, the INTERNAL RESPONDER can also exchange information, such as audio, text, chat, and other data, with this user.

If the INTERNAL SURVEILLANCE CENTER receives an alert about an incident such as a crime in progress, then based on the Response Guidelines the INTERNAL SURVEILLANCE CENTER may decide to forward the incident to a DISPATCHER. This can be done by using the INTERNAL SURVEILLANCE CENTER software. The software sends an alert to the ZAP SERVER which in turn routes it to the nearest DISPATCHER. For example, if someone reports a bank robbery by entering the ZAP CODE of the robbery location, this ZAP CODE is sent from the ZAP SERVER to the bank's INTERNAL SURVEILLANCE CENTER. Upon receiving this alert, the INTERNAL SURVEILLANCE CENTER may send the alert to the Dispatcher. If the ZAP FACILITY is in a ZAP PROTECTED COUNTY, the DISPATCHER will receive the alert on his ZAP DISPATCH software and can view the live feed from the cameras attached to this ZAP CODE, e.g., the ZAP CODE CAMERAS. The DISPATCHER can also view any video clips attached by the INTERNAL SURVEILLANCE CENTER.

If the DISPATCHER is in a ZAP PROTECTED COUNTY and wants to forward this alert to a FIRST RESPONDER in the vicinity of the incident, then he can do so by routing the alert via the ZAP SERVER to the ZAP FIRST RESPONDER software. The FIRST RESPONDER will receive the alert on his mobile device and/or laptop computer and he can view the live feeds from the ZAP CODE CAMERAS as well as any clips attached to the incident by the INTERNAL SURVEILLANCE CENTER.

If the ZAP FACILITY is not in a ZAP PROTECTED COUNTY, then the INTERNAL SURVEILLANCE CENTER calls 911 or otherwise notifies local emergency personnel, typically via telephone.

Figure 2:
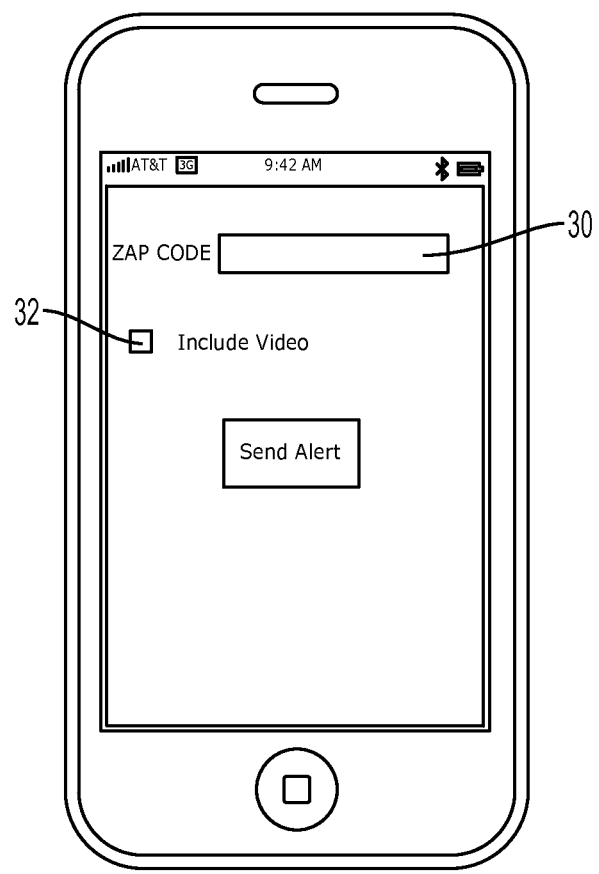
FIG. 2 shows an exemplary screen of the ZAPAPP on a mobile device.

FIG. 2 shows an exemplary screen that illustrates how an alert can be submitted by a user to ZAP SERVER using ZAPAPP as a method of providing alerts to incidents. The Text box 30 provided on the screen allows the user to enter the ZAP CODE of the facility. In addition, if the user chooses to stream video from his mobile device, then the streaming can be facilitated by checking the check box 32 labeled "Include Video".

If the user does not include video from his device, then only an alert is sent to the ZAP SERVER, which receives the alert and routes it to the INTERNAL SURVEILLANCE CENTER of the facility associated with the ZAP CODE. If the user checks the check box 32 and includes the video feed from his mobile device along with the alert, then the video feed is received and stored by the server along with the alert. The user's video feed provides the INTERNAL SURVEILLANCE CENTER with an additional vantage point on the incident. The user's video feed can also provide the capability for communication between the user and the Internal Surveillance Center via voice and text, e.g., chat.

Figure 3:
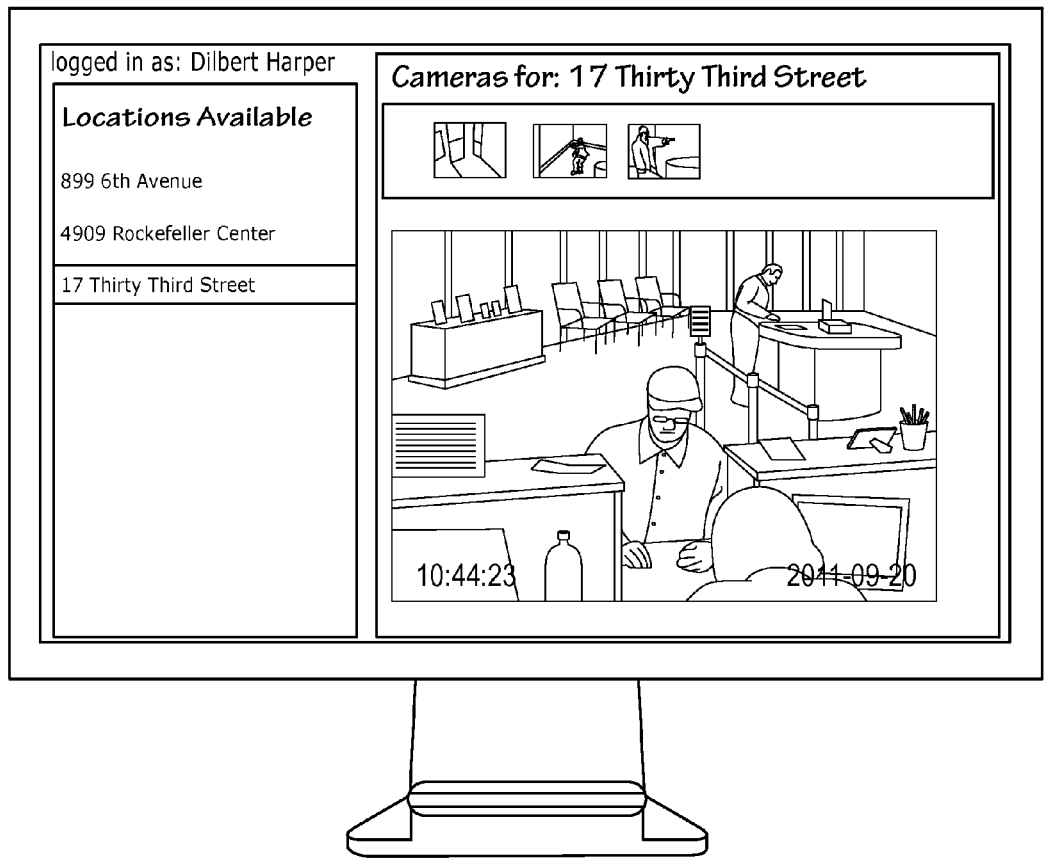
FIG. 3 shows an exemplary screen of an INTERNAL SURVEILLANCE CENTER computer monitor when no incident is pending.

FIG. 3 is an exemplary screen illustrating a ZAP INTERNAL SURVEILLANCE CENTER computer monitor (screen) while it is performing normal surveillance. Information regarding the log-in of the system operator can be provided on the top of the screen. On the left of the screen is a list of locations available to receive camera feeds from. When a particular location from the left side menu is clicked, the right side of the screen shows the available cameras on the top. In FIG. 3, the location at the end of the list, "17 Thirty Third Street", is highlighted; the system operator has clicked this location. Once a camera feed is clicked, the location of the camera is shown on the top right and beneath this information, a small camera feed from each camera at this location is displayed. The selected camera feed is enlarged and shown on the bottom right portion of the screen. Any of the camera feeds can be clicked from the top to view that camera feed in the bottom portion of the screen.

Figure 4:
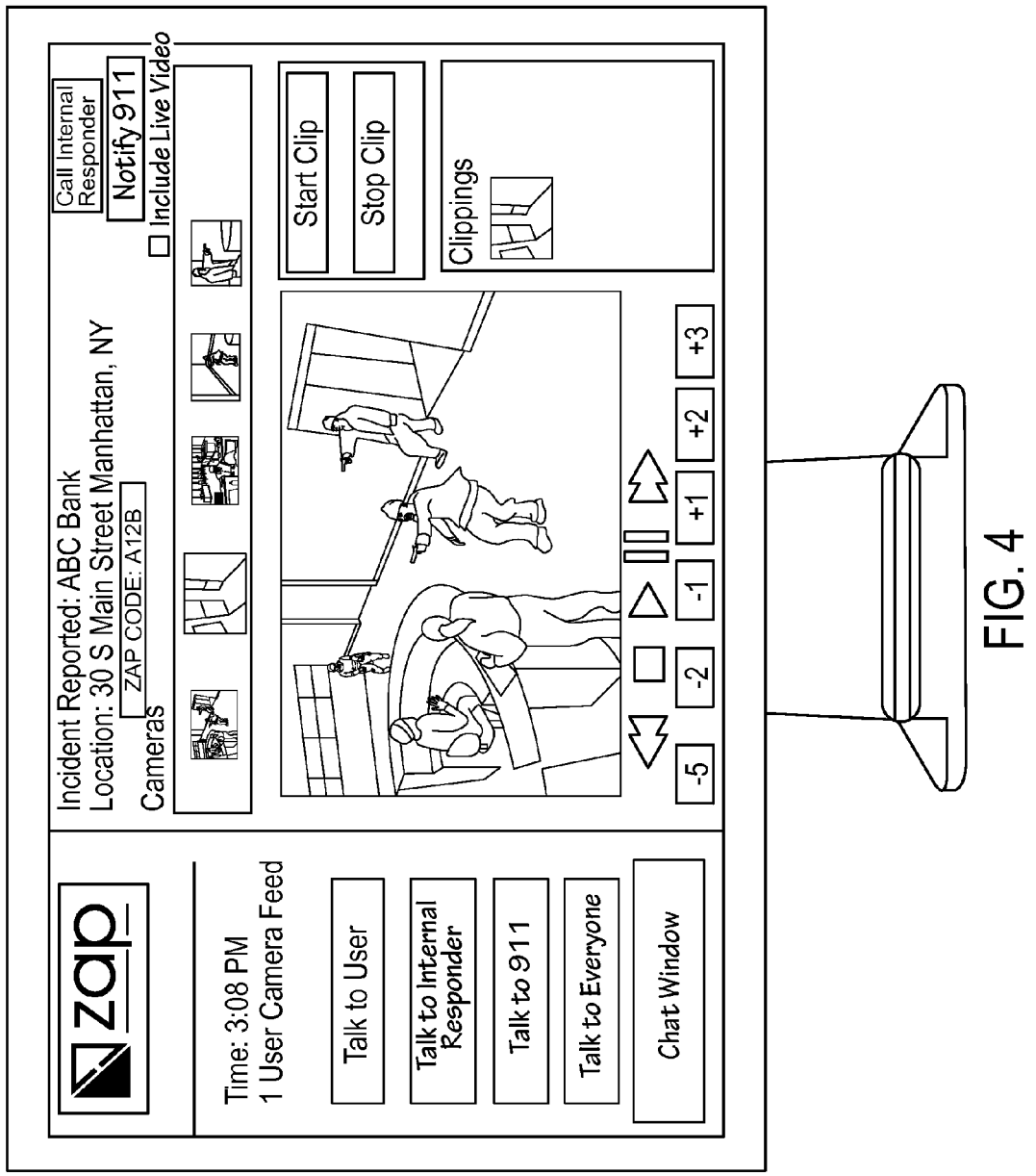
FIG. 4 shows an exemplary screen of an INTERNAL SURVEILLANCE CENTER computer monitor when an incident is reported.

FIG. 4 is an exemplary screen illustrating the ZAP INTERNAL SURVEILLANCE CENTER when an incident is reported. As discussed above, the incident is reported when a user enters the ZAP CODE of one of the locations under surveillance in a ZAP FACILITY. The alert is routed to the screen of the ZAP INTERNAL SURVEILLANCE CENTER. As a part of the alert, the internal surveillance center screen displays, at the top of the screen, identifying information including the name of the ZAP CODE location, e.g., "ABC Bank", the street address for the ZAP CODE location and the ZAP CODE. Below this identifying information are the video feeds from the ZAP CODE CAMERAS, that is, the cameras associated with this ZAP CODE. Any of the displayed cameras can be selected, e.g., clicked on, and the video feed from the selected camera can be enlarged and viewed at the bottom portion of the screen.

The controls at the bottom portion of the screen, below the camera feed, allow the surveillance personnel to go back, play, pause, and/or forward the feed. In addition, there are buttons below the controls where the surveillance personnel can "jump" in video. For example, clicking on the −2 button would take the video 2 minutes in the past from what is being currently displayed. This is done to allow the surveillance personnel to quickly move back and forth in the video.

The "Start Clip and Stop Clip" section towards the right of the video feed allows extraction of a video clip from the video feed. For example, if the surveillance personnel want to show only ten seconds of video to the INTERNAL RESPONDER then the surveillance personnel can "extract" this clip by clicking on the "Start Clip and Stop Clip" section. In one embodiment, the operator toggles between "Start Clip" (to start extraction) and "Stop Clip" (to stop extraction) in accordance with the activity being performed. After clicking on this section, the surveillance personnel can then click on the "Call Internal Responder" button in the top right hand corner. When a clip is extracted in this fashion, the clip is given higher priority than the live video feeds. The INTERNAL SURVEILLANCE CENTER may attach multiple clips to an incident. All of these clips will be made available to the INTERNAL RESPONDER or the DISPATCHER or FIRST RESPONDER if they are involved in the incident. If more clips are attached to the incident after the incident has been forwarded to the INTERNAL RESPONDER or DISPATCHER, then the additional clips are also made available to them.

The "Include Live Video" check box shown in the upper right of the screen in FIG. 4 allows the INTERNAL SURVEILLANCE CENTER to forward the video feeds from the ZAP CODE CAMERAS to the INTERNAL RESPONDER and/or the DISPATCHER.

On the left side of the screen in FIG. 4, the time of the incident is shown. If a user is involved in the incident (a user can be involved for this purpose only if he is streaming video from his mobile device or if the user has made a phone call from his mobile device) then the INTERNAL SURVEILLANCE CENTER has an option to communicate with the user by exchanging audio by clicking on the "Talk to User" button and/or by using a chat window to chat. If the user initiates the alert with a special alert device without audio capability, the Internal Surveillance Center will not have the ability to communication with the user. The INTERNAL SURVEILLANCE CENTER can also talk to other parties, e.g., Internal Responders, DISPATCHER, in the incident by clicking on their respective buttons from the screen. If the Internal Surveillance Center wishes to talk to everyone at once, then the "Talk to Everyone" button can be clicked.

Figure 5:
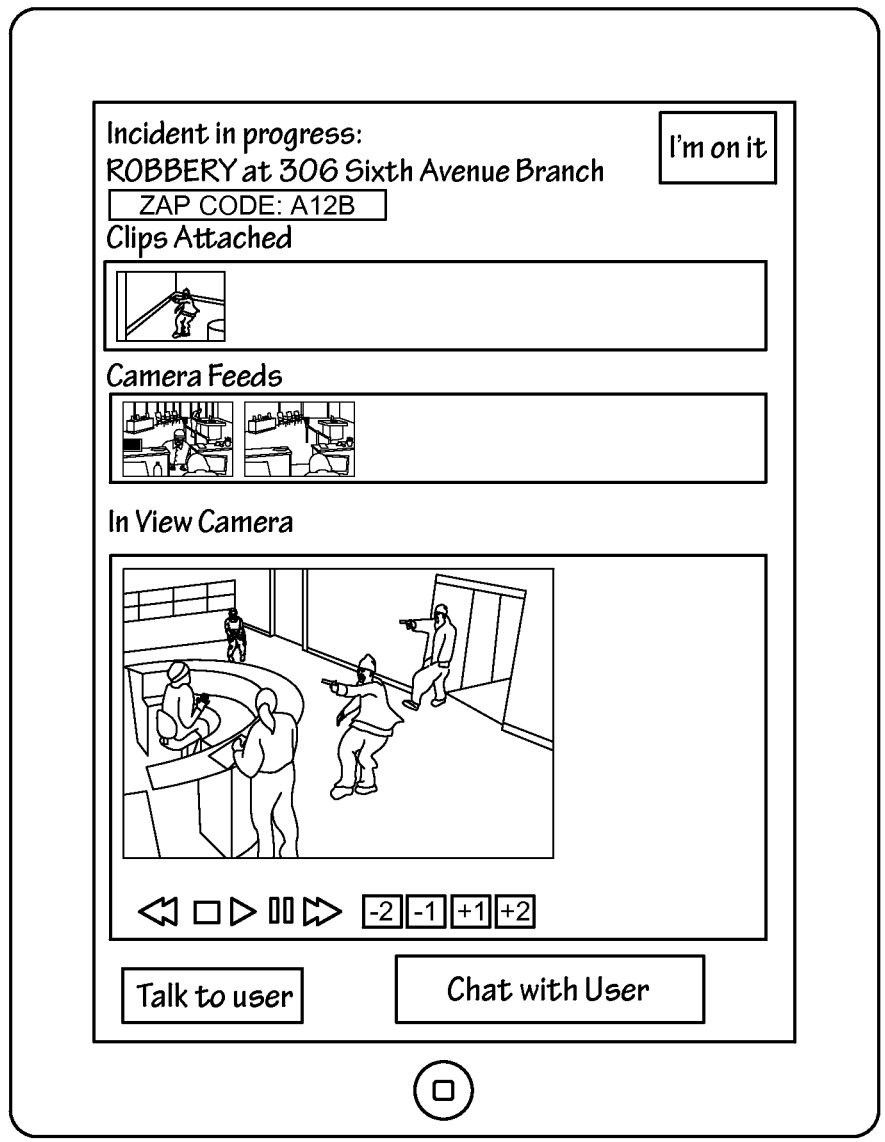
FIG. 5 shows an exemplary screen of an INTERNAL RESPONDER personnel device.

FIG. 5 is an exemplary screen illustrating the ZAP INTERNAL RESPONDER personnel device. When an alert is sent to the INTERNAL RESPONDER, he sees the address where the incident is taking place and the ZAP CODE, along with the attached clips from the INTERNAL SURVEILLANCE CENTER and videos from the ZAP CODE CAMERAS. In addition, a brief description or tag describing the incident is displayed at the top of the screen.

The INTERNAL RESPONDER can click on any of the attached clips or the camera feeds to view the incident from the different cameras. The INTERNAL RESPONDER can also move forward or backward in the video feeds or clips to assess the situation better. The screen interface also provides a 'quick step' functionality to move forward or backward in the video in steps; this is implemented using the +2, +1, −1, −2 buttons that help one easily move forward or backward in the video.

The "I'm on it" button on the top right corner can be clicked by the Internal Responder to indicate that he or she is responding to the situation. This response is recorded in a database of incidents in the ZAP SERVER. This incidents database can be used to create reports and provide data to the ZAP FACILITY.

Figure 6:
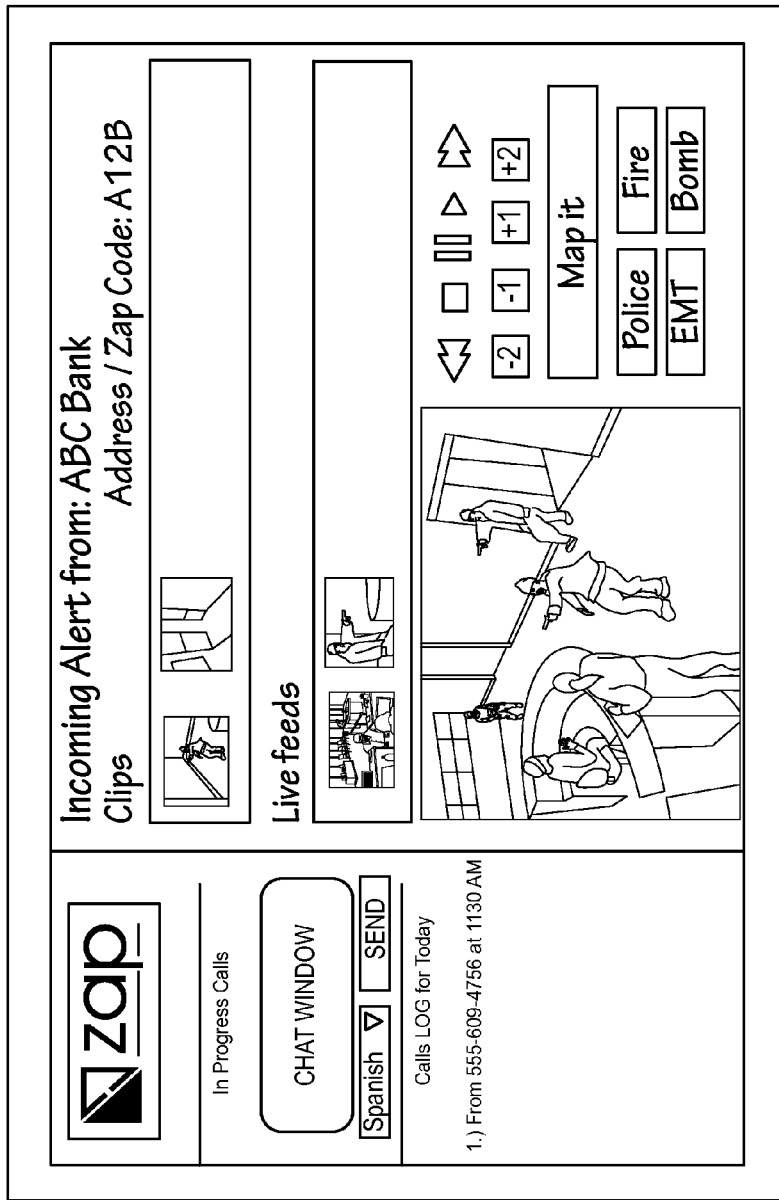
FIG. 6 shows an exemplary screen of a 911 DISPATCHER using ZAP DISPATCH software when an alert is received from an INTERNAL SURVEILLANCE CENTER.

FIG. 6 is an exemplary screen illustrating the ZAP 911 DISPATCH screen which can be displayed when DISPATCHER, in a ZAP PROTECTED COUNTY, receives an alert from a ZAP CODE location. The alert shows to the Dispatcher the address and ZAP CODE that the alert is coming from along with any video clips attached to the incident by the INTERNAL SURVEILLANCE CENTER and the ZAP CODE CAMERAS associated with the ZAP CODE associated with the alert.

The DISPATCHER also has the controls to move back and forth in the video clips and switch between cameras and video clips added to the incident. The DISPATCHER can also communicate with the user who is streaming the video if such a user is available. The DISPATCHER can communicate via text and/or chat with this user, using the chat window. The translation feature is available to be able to communicate with the user in his language. In addition, the DISPATCHER can map the location of the incident by clicking the "Map It" button and can contact various FIRST RESPONDERS including police, fire, EMT and Bomb Squad by clicking the appropriate button.

Figure 7:
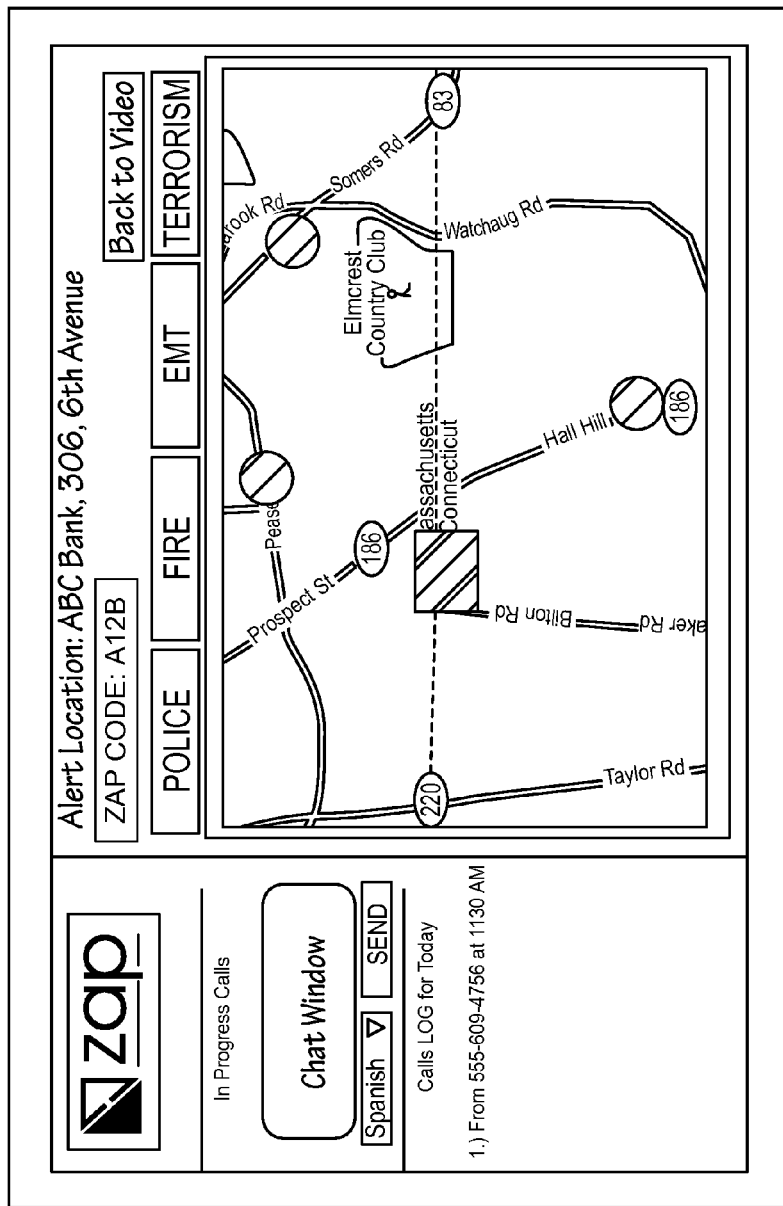
FIG. 7 shows an exemplary screen of a 911 DISPATCHER viewing a map of the location from where the alert is being sent.
Figure 7:
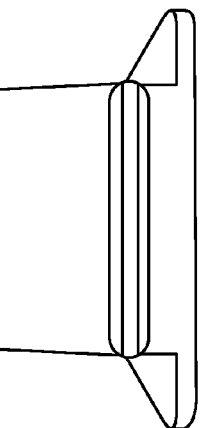

FIG. 7 is an exemplary screen illustrating how the dispatcher can view the map of the location from where the incident is being reported, e.g., the geographic and/or physical location of the ZAP CODE. The DISPATCHER can map the incident and on the map he can view the location of the incident along with any FIRST RESPONDERS that may be present in the vicinity of the incident. The alert can then be sent to the FIRST RESPONDERS in the vicinity simply by clicking on their icons in the map.

Figure 8:
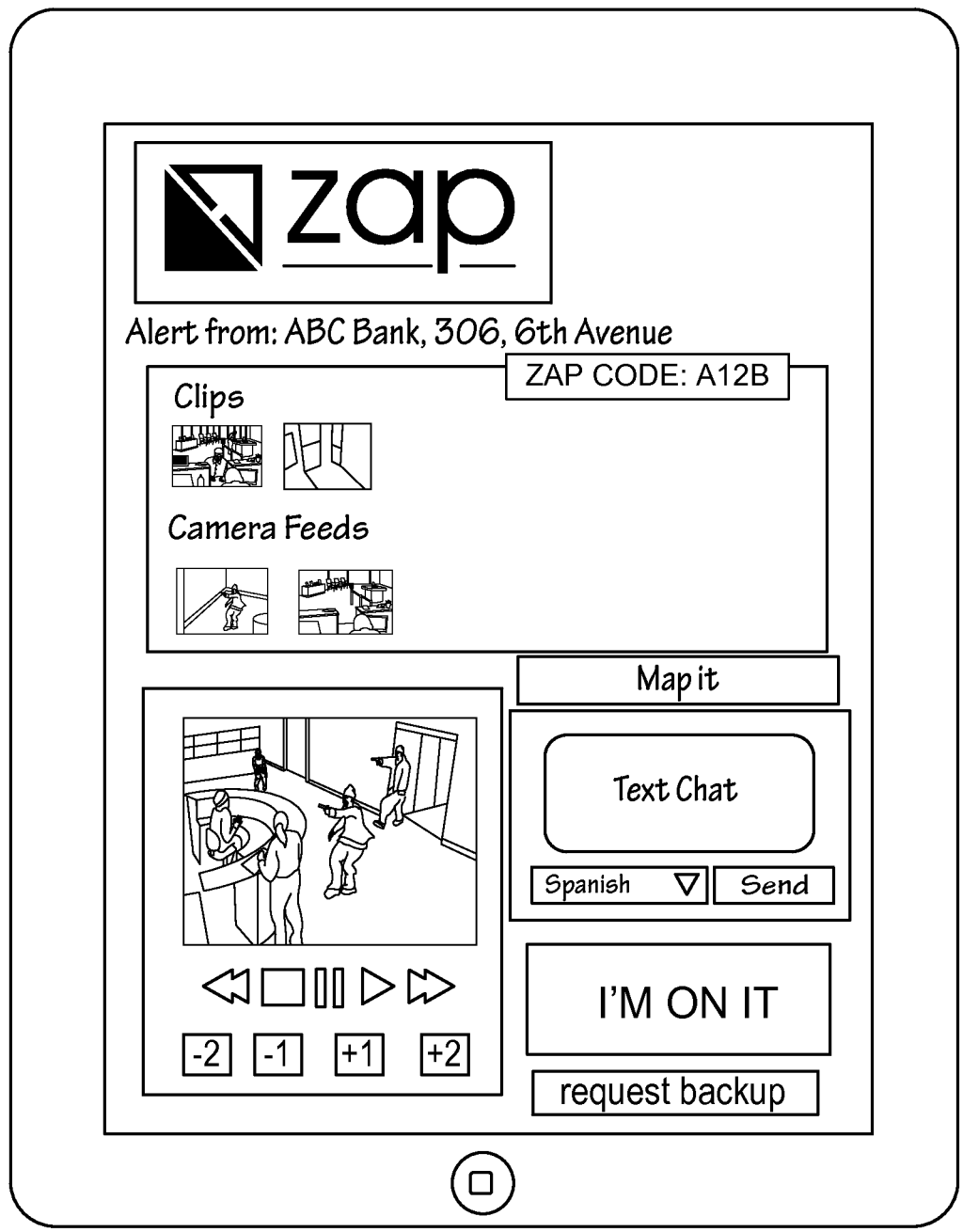
FIG. 8 is an exemplary screen of FIRST RESPONDER when an alert is received.

FIG. 8 is an exemplary screen illustrating the FIRST RESPONDER receipt of an alert on his mobile device. The alert shows the address where the alert is coming from and the ZAP CODE, along with any video clips that were added by the INTERNAL SURVEILLANCE CENTER and video camera feeds from the ZAP FACILITY. Any of the video clips or camera feeds can be viewed by clicking on them and viewing them in the area below the camera feeds. The FIRST RESPONDER has the functionality to chat with the user who sent this alert unless the alert was sent from a special alert device without audio capability and is involved in the call. Translation facility is also provided. The FIRST RESPONDER can indicate if he is responding to the situation by clicking on the "I'm on it" button from the interface provided.

The FIRST RESPONDER software also provides the capability to move forward and backwards in the video using appropriate buttons, including back, forward, play, and pause buttons and +2, +1, −1, −2 buttons, which enabling moving through the video in steps of minutes.

ZAP SERVER software binds the components together. Typically this software is installed on servers that are owned and operated by ZAP, but third party operations, e.g., cloud servers, can also host ZAP SERVER.

Functions performed by ZAP SERVER can include listening for incoming distress calls from ZAPAPP, maintaining the database of ZAP CODES and ZAP CODE CAMERAS, sending alerts to the Internal Surveillance Center and Internal Responders, sending alerts to 911 operator or dispatcher, web site hosting, receiving incoming video, picture, text and/or audio data regarding an incident, streaming video, maintaining geo-locations of first responders, maintaining first responder engagement records, mapping the incident for directions, maintaining a database of all users and incidents, keeping logs and identifying ZAP CODE CAMERAS in the vicinity of the alert and making accessible the video feeds from the ZAP CAMERAS to the Internal Surveillance Center and the Internal Responders. These features are described in more detail below.

ZAP SERVER, e.g., server, listens for incoming distress signals or alerts. ZAPAPP can send a signal, e.g., an alert, to the ZAP SERVER when a distress call originates from a mobile device running ZAPAPP. ZAP SERVER listens on a pre-designed port on the server (say port Number 35678 as an example). ZAPAPP can send an alert to that port (port 35678 in this example). An alert is sent to the server by the ZAPAPP by sending certain information in a certain format to the port. For example, the format can be XML, JSON, or TEXT format. The information may or may not be encrypted based on the security convention followed. This communication, e.g., sending an alert, can be simple HTTP based or via a Socket Call.

The ZAP SERVER can also receive signals from special devices transmitting ZAP CODES and related to ZAP FACILITIES, and data regarding ZAP CODES from telephones. In one embodiment, the ZAP SERVER receives video feeds from cameras associated with a ZAP CODE and stores the video on the storage connected to the server. In another embodiment, the ZAP SERVER manages video feeds received and stored on devices owned or controlled by the ZAP FACILITY or a third party provider.

Figure 9:
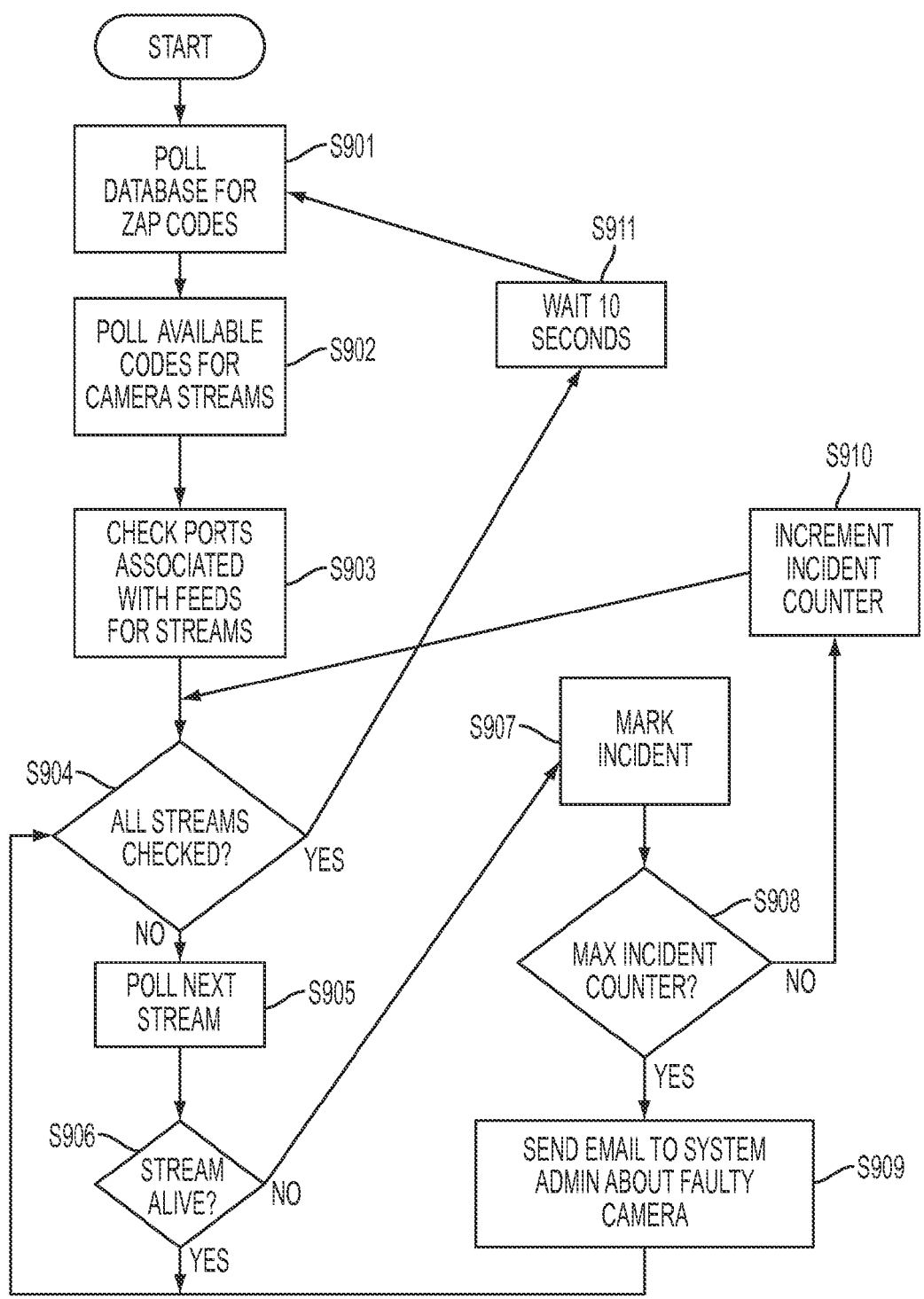
FIG. 9 is a flow diagram of ZAP SERVER checking camera streams.

FIG. 9 is a flow diagram of ZAP SERVER checking camera streams. In step S901, poll the database of ZAP CODES for all ZAP CODES available. In step S902, poll each ZAP CODE to obtain the camera streams associated with each CODE. In step S903, check all the feeds from the cameras by polling the IP Addresses and ports where the feeds are received from. If all the streams have not been checked (S904=NO), then poll the next stream in step S905. If this next stream is "alive" (S906=YES), then processing continues at S904.

If the stream is not "alive" (S906=NO), then the server marks an incident in the database in step S907. If the incident counter is a predetermined maximum value (S908=YES), then a message, typically an email, is sent to the System Administration about the faulty camera in step S909. Hence, after a set number of retries, if the feed does not come back up, then the server sends an email alert to the system administrator advising him of the camera feed being absent. This is to provide remedial action (as the camera may be down or the network cable may be loose or any other condition that may lead to a camera feed going bad). After sending the message, processing continues at step S904.

If Max incident counter is not greater than the predetermined maximum (S908=NO), then increment the incident counter in step S910. Continue processing at step S904.

If all of the streams have been checked (S904=YES), then wait a predetermined amount of time, for example ten seconds, at step S911. Then continue processing at step S901.

Figure 10:
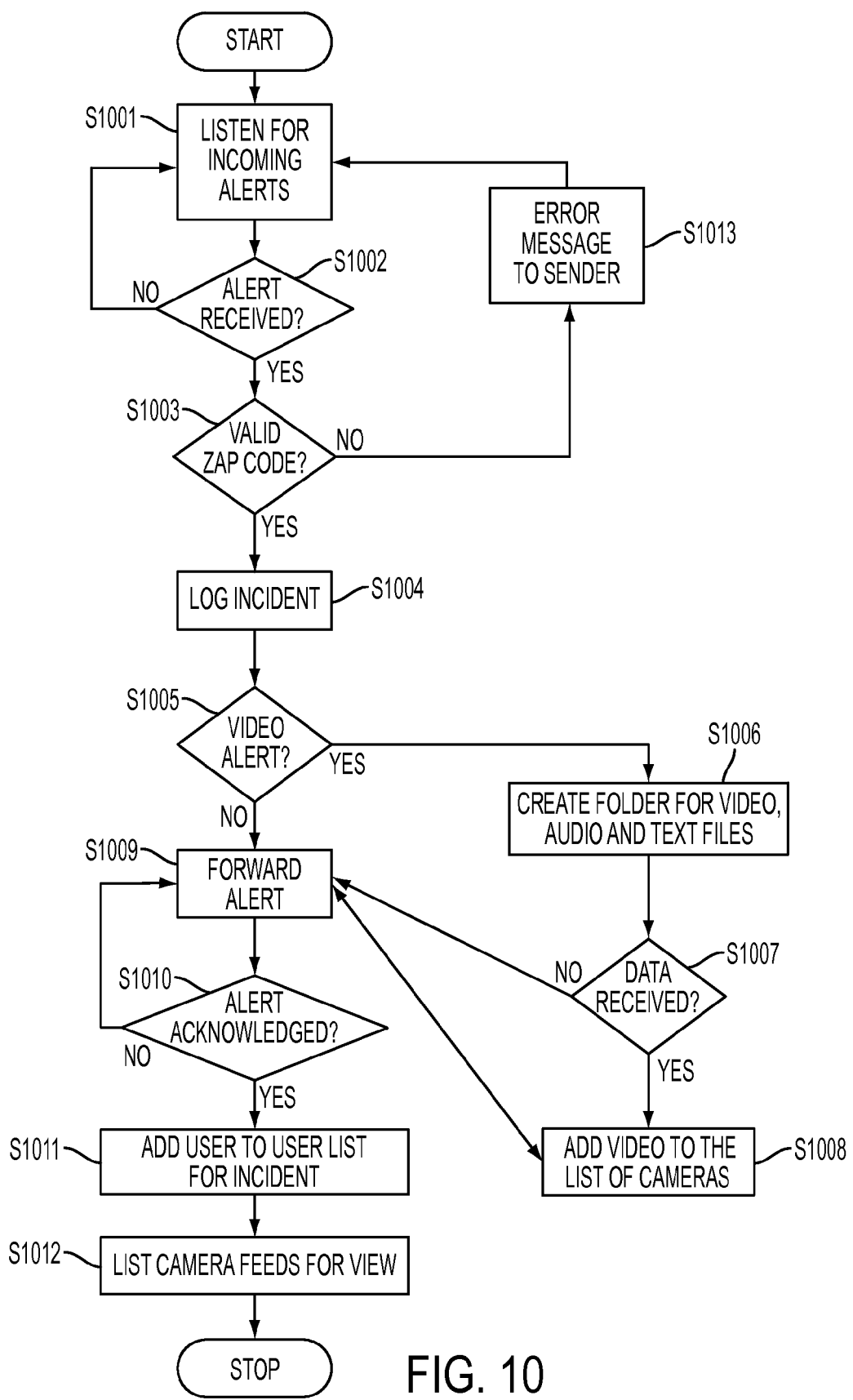
FIG. 10 is a flow diagram of incident notification received and forwarded by ZAP SERVER.

FIG. 10 shows a flow diagram describing how an alert is received and forwarded by the ZAP SERVER to the internal surveillance center. At step S1001, the ZAP SERVER listens at a pre-designed port (as an example say port number 8989) for any incoming alerts. If an alert is received (S1002=YES), e.g., an alert is sent from the ZAP APP to the ZAP SERVER via HTTP, then the server validates the alert to reject any invalid alerts (for example a user may type in the wrong ZAP CODE). If the ZAP CODE is a valid ZAP CODE in the system (S1003=YES), then the incident is logged in the ZAP SERVER database in step S1004. If the alert is a video alert (S1005=YES), that is, if the ZAP SERVER determines that the user is also streaming video from his device, then the server creates a folder to store the incoming video files at step S1006. If the data, e.g., incoming video files, is received (S1007=YES), then add video to the list of cameras provided for view to the parties involved in the incident at step S1008. If no data is received (S1007=NO), then processing continues at step S1009.

In step S1009, the server determines the internal surveillance center associated with this ZAP CODE and forwards the alert to the computer terminals associated with this internal surveillance center, where the alert is viewed using the ZAP INTERNAL SURVEILLANCE software described above. If the alert is acknowledged (S1010=YES), then the user is added to the list of users at step S1011 and a list of camera feeds for view is provided at step S1012.

If the alert is not acknowledged (S1010=NO), then processing continues at step S1009.

If there is no video alert (S1005=NO), then processing continues at step S1010.

If the ZAP CODE is not valid (S1003=NO), then an error message is sent to the sender, e.g., the user, at step S1013 and processing continues at step S1001. Further, if no alert is received (S1002=NO), then processing continues at step S1001.

Figure 11:
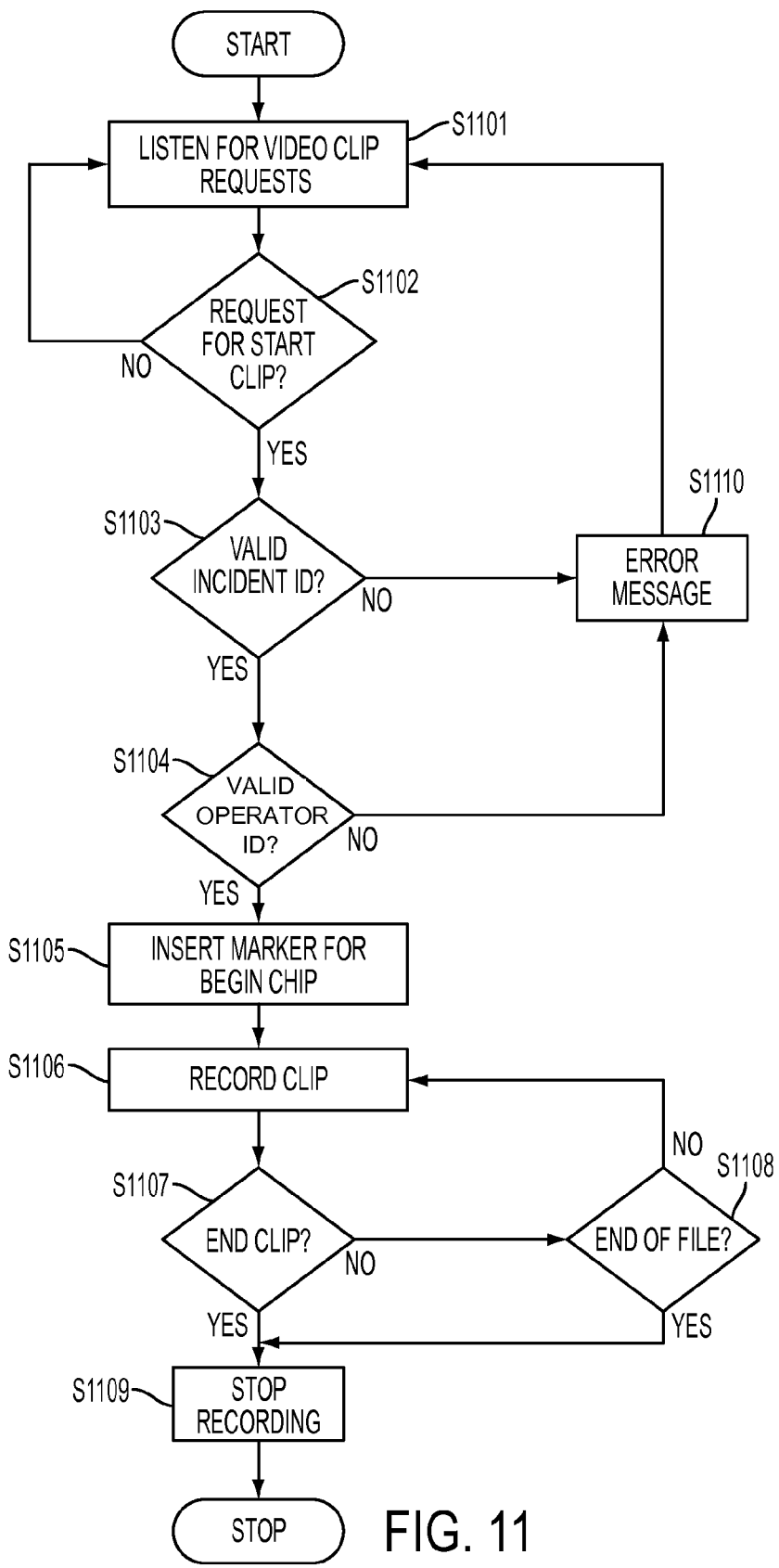
FIG. 11 is a flow diagram of the process of extracting a video clip by surveillance personnel.

FIG. 11 shows a flow diagram of how a clip can be created for an incident by the internal surveillance center. In step S1101, the ZAP SERVER listens on a designated port to start the clip creation process. If a request to start a clip is received (S1102=YES), then the incident ID is checked, that is, once the internal surveillance center starts creating a clip, the request to start along with the incident ID is sent to the ZAP SERVER. If it is a valid incident ID (S1103=YES) and if the operator id is valid (S1104=YES), e.g., this operator is authorized to access this video, then a marker is inserted for beginning a clip in step S1105. In step S1106, the server records the clip, that is, starts extracting the video from the source video file. If an end clip request is received (S1107=YES) or if the end of the file is reached (S1108=YES), then the recording is stopped in step S1109. In other words, recording continues until an "end clip" request is received on the same port or if the file goes all the way to the end. This extracted clip is then stored on the server as a part of the incident.

If the end clip request is not received (S1107=NO) and if the end of file is not reached (S1108=NO), then processing continues at step S1106.

If the incident is not valid (S1103=NO) or the operator id is not valid (S1104=NO), then an error message is generated in step S1110 and processing continues at step S1101. If a request to start a clip is not received (S1102=NO), then processing continues at step S1101.

Figure 12:
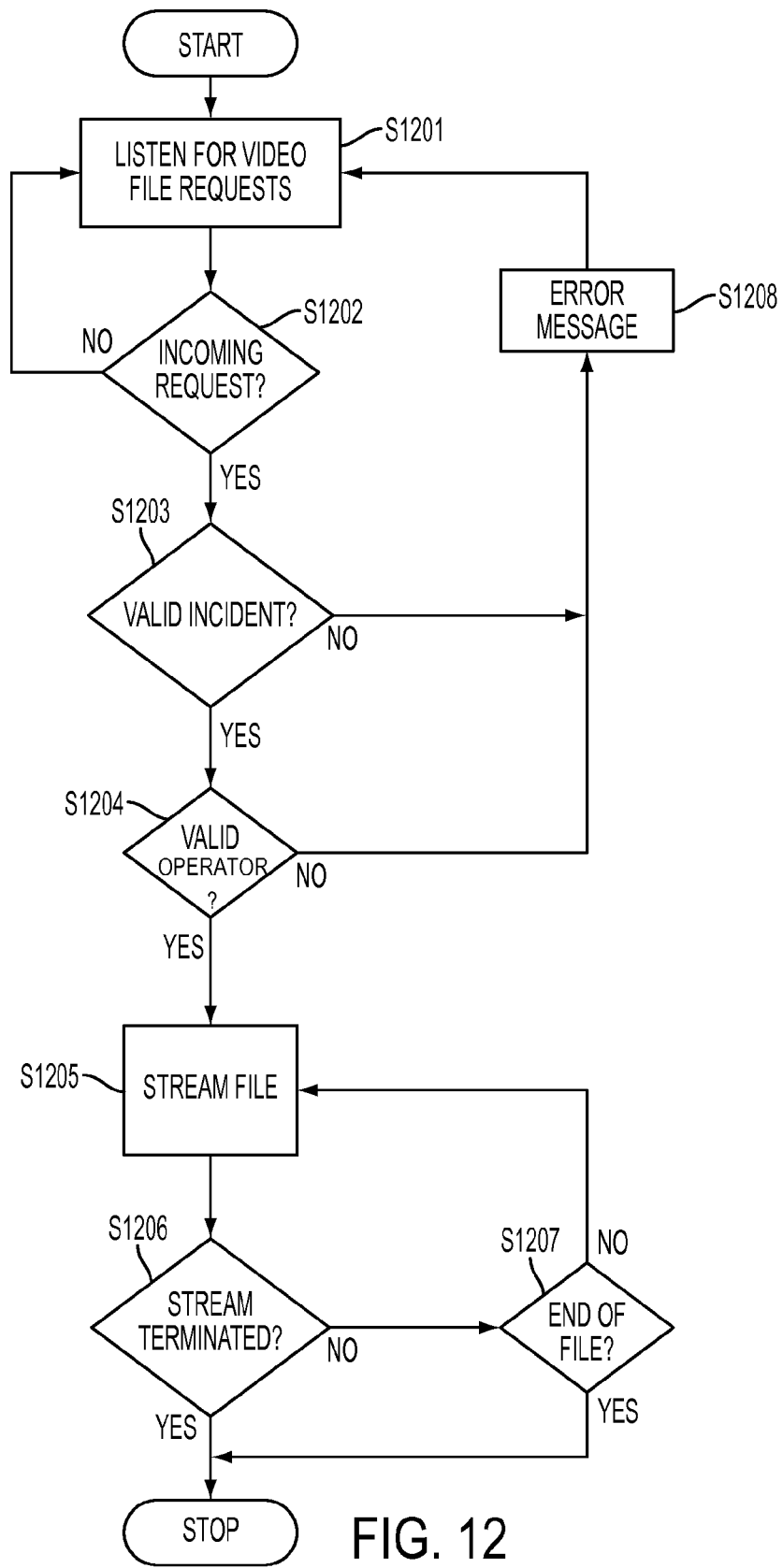
FIG. 12 is a flow diagram of the process of how a video file is requested and streamed by ZAP SERVER.

FIG. 12 shows how a video file is requested and played from the server. At step S1201, the server listens on a designated port for incoming requests to play a particular file. If a request is received (S1202=YES), then the server evaluates if the incoming request is coming for a valid incident and from a valid operator. If the incident is valid (S1203=YES) and the operator is valid (S1204=YES), then the file is streamed to the requesting operator at step S1205. If the stream is terminated (S1206=YES) or the end of the file is reached (S1207=YES), then the file streaming is terminated.

If the stream is not terminated (S1206=NO) and if the end of file is not reached (S1207=NO), then processing continues at step S1205.

If the incident is not valid (S1203=NO) or the operator id is not valid (S1204=NO), then an error message is generated in step S1208 and processing continues at step S1201. If a request for video file is not received (S1202=NO), then processing continues at step S1201.

ZAP SERVER can receive incoming video, picture, text and/or audio data on an incident. If an incoming video and/or audio and/or text is received at ZAP SERVER, then the session for incoming data is validated. If it is a valid session, then the incoming files are received and stored in the designed location. When the incoming file is complete, processing stops. If the data session is not valid, then an error message is sent and the file and/or incoming information is rejected. If no incoming information is received, the server waits for information.

ZAP SERVER can stream video from the server to the INTERNAL SURVEILLANCE CENTER, INTERNAL RESPONDERS, DISPATCHER and/or FIRST RESPONDER. ZAP SERVER can also stream video to the ZAP WEB SITE. As discussed above, the video that is received from the mobile device of a user for an incident is stored on the ZAP SERVER. If the INTERNAL SURVEILLANCE CENTER requests this video, then this video is streamed from the server to the INTERNAL SURVEILLANCE CENTER who can see the video in live mode, e.g., real time view, or in Recorded Mode. In recorded mode, the INTERNAL SURVEILLANCE CENTER can go back to the point in time when the video was recorded and play from there.

The same capability is also available to one or more INTERNAL RESPONDERS. The INTERNAL RESPONDERS can stream the video live or in recorded mode on their devices. In other words, ZAP SERVER allows for the video to be streamed from the server to the Internal Surveillance Center and/or the INTERNAL RESPONDER.

The processing on ZAP SERVER to stream video from ZAP SERVER to the requesting device is described. First, listen for requests to serve video. If there is an incoming request, then determine the requesting device. If the request is an iPhone and/or iPad based request, the H.264 format is chosen. Otherwise, FLV format is chosen for video transmission. After selecting the format, the file is streamed to the requesting device. When the file is completely streamed, the process stops.

The process for ZAP SERVER to send the information, such as audio, text and picture data, to the recipient devices, such as, user, Internal Surveillance Center, INTERNAL RESPONDER, dispatcher, first responders, etc., involved in the incident is described. ZAP SERVER listens for incoming information such as audio, text or picture data. When data is received, it is stored in a designated folder. Next, a list of everyone involved in the incident is obtained. If there are members in this list, then wait for the members to join in.

When there are no (or no more) members found, then a send list, comprising everyone in the incident except the sender, is created, and the data is sent to recipient devices.

In one embodiment, where the location of the Internal Responders can be determined by global positioning (GPS) technology, ZAP SERVER gets an update every fixed number of seconds, for example every 30 seconds, from the mobile device of the Internal Responders. The data that it receives is the geo-location of the device. This enables ZAP SERVER to keep an updated record regarding where the Internal Responder is located presently. When an incident is reported, ZAP SERVER goes through the Internal Responder location database and comes up with the list of Internal Responders in the vicinity of the incident. These are then mapped on the INTERNAL SURVEILLANCE CENTER software for the system operator to forward the incident to the Internal Responders.

It should be noted here is that the system only keeps track of the present location of the Internal Responder. The system does not keep a log of where the Internal Responder has been. The intent is not to track the Internal Responders. The intent is only to keep a record of where they are at the present moment so that alerts can be forwarded to them in an efficient and accurate fashion.

The process of how the geo-location data on the Internal Responders location is updated on the server is described. First, listen for incoming data. If data is incoming, then read and validate the geo-location and/or device id from the incoming data. If the data is valid, then update the record in the database to be the current location of the device, based on the geo-location. If the data is not valid, reject the data and again listen for incoming data.

In another embodiment, where the location of the Internal Responder cannot be determined by GPS technology, the location of the Internal Responder is determined by other methods utilized by the ZAP FACILITY.

Once an Internal Responder gets an alert and the Internal Responder indicates that he or she will respond to an incident, then ZAP SERVER marks this Internal Responder as "Engaged in Incident" in the database. Once an incident is completed, the status of the Internal Responder changes to "available".

When the Internal Surveillance Center or the Internal Responder wishes to view the incident on a map, such as a road map or city map or geographic map, ZAP SERVER provides such a map. Known technologies, such as those available from Google® maps and Bing® maps, can be used. ZAP SERVER can push out a visual map of the area where the incident is happening to the dispatcher with an overlay of the locations where the first responders are present. ZAP SERVER can also create a route for the Internal Responders to get to the destination, for example using standard mapping software.

ZAP SERVER tracks the status of each incident by maintaining a log of all activity on the incident in the ZAP DATABASE. Status of the incident can include Internal Surveillance Center notified of the situation, Internal Surveillance Center accepted the alert, Alert forwarded to Internal Responder, Internal Responder responding to the situation, and if the ZAP FACILITY is in a ZAP PROTECTED COUNTY, Dispatcher notified of the situation, Dispatcher accepted the alert, Alert forwarded to First Responder, First Responder responding to the situation. Other types of status can also be included.

As discussed above, ZAP SERVER maintains a database including at least all registered users, all incidents, all video for incidents, all images (pictures) for incidents, all audio for incidents, all text messages for incidents, which Internal Surveillance Center and/or Internal Responders, and/or dispatcher and/or first responder responded to the incident, who has seen the video and timestamps on these elements, the timestamps including time of call, time of audio exchange between people, time of text exchange, time of a status change on the incident, etc. Other elements can also be included in this database. This information can be stored on a computer storage device, such as a hard drive, and can be managed using a relational database (RDBMS) system.

ZAP SERVER also maintains a log of all incidents. All information, including visual, picture (image), audio and text exchange for an incident is stored on the server for a fixed period of time.

ZAP INTERNAL SURVEILLANCE CENTER includes software that is provided to operators as a downloadable piece of software that can be obtained via special logins on the ZAP WEB SITE, or as prepackaged hardware, or on a CD. The software can include the ability to receive incoming alerts, to preview incoming calls, to accept a call, to reject a call, to merge calls, to "map" incidents, to communicate with the caller via text and/or voice, to forward the incident to the appropriate first responder(s) and to terminate the call when appropriate. A call can be terminated when it is no longer needed. When an incoming call is accepted by the dispatcher as a valid emergency situation, the call becomes an "incident".

The details of the ZAP CODE assignment for a particular facility will vary depending on several factors. The number of ZAP CODES can vary according the size of the facility, the sophistication of the facility including the number and concentration of cameras available. A ZAP FACILITY can be defined by geographic location which can be divided into ZAP CODES such as separate buildings, floors within a building, individual rooms, space(s) within a room, etc. Hence, if a ZAP FACILITY is dispersed, such as a bank having several branches, a university or school system having several locations, etc., two ZAP CODE locations of one ZAP FACILITY could be physically separated from each other. In another embodiment, the entire ZAP FACILITY could be assigned an emergency code such as 912 instead of 911.

Figure 13:
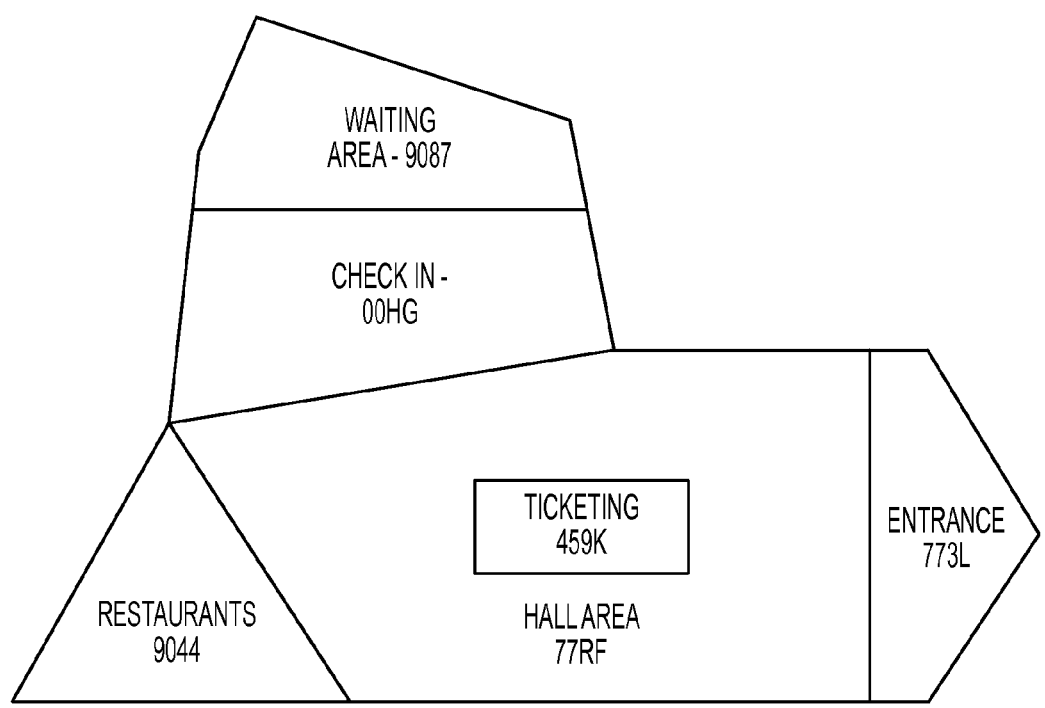
FIG. 13 illustrates ZAP CODE assignments in an exemplary ZAP FACILITY.

FIG. 13 illustrates an exemplary facility of an airport terminal which comprises six distinct locations or areas. As shown in FIG. 13, each location is assigned its own, unique ZAP CODE. Specifically, the terminal entrance is assigned ZAP CODE 773L. Restaurants in the terminal are assigned ZAP CODE 9044. The Ticketing area is assigned ZAP CODE 459K and the hall area around the ticketing area is assigned ZAP CODE 77RF. The Check-In area is assigned ZAP CODE 00HG and the Waiting area is assigned ZAP CODE 9087.

In addition to assigning ZAP CODES to specific locations and connecting these codes with the appropriate cameras, the ZAP FACILITY determines Response Guidelines. If desired, different ZAP CODES in the same ZAP FACILITY could have different Response Guidelines. As discussed above, these Response Guidelines are used by ZAP SERVER to determine how to respond to an alert with a specific ZAP CODE.

Advantageously, the invention allows a ZAP FACILITY to enable users in the physical facility to report incidents to the Internal Surveillance Center as opposed to calling 911. For example, a university might prefer alert calls from students, faculty and employees to be initially handled by campus security. In another example, the operators of a corporate office park might prefer situations to be initially handled by the corporate security office, instead of calling 911.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The terms "click" and "click on" as may be used in the present application may include a variety of techniques for input, such as touching the screen, pressing with a stylus device, announcing voice command and other known methods.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for generating security alerts for a facility from a remote device, comprising:
 a server having:
 a CPU;
 a first module operable to assign one or more codes to the facility, each code identifying a different location within the facility irrespective of the location of the remote device, the module further operable to associate one or more cameras in the facility with each code, and associate response guidelines with each code; and a second module operable to receive the one or more codes from the remote device, notify a surveillance center of the location assigned to the one or more codes based on the response guidelines, stream video from the one or more cameras associated with the one or more codes to the surveillance center, and generate a security alert based on the video stream, wherein the remote device is configured for a user to enter one of the one or more codes to identify a location of the security alert in a location in the facility irrespective of the location of the remote device, wherein the remote device has a module enabling sending of the code, live video of a visible event and live audio, the live video being a video stream separate from the video streamed from the one or more cameras, and wherein the live video and the live audio being routed through the server and combined with video streamed from the one or more cameras to the surveillance center.

2. The system according to claim 1, wherein the server enables bi-directional communication between the remote device and the surveillance center.

3. The system according to claim 1, further comprising a third module operable to stream the video from the surveillance center and the live video and the live audio from the remote device to one or both of a dispatcher and an internal responder based on the response guidelines.

4. The system according to claim 3, wherein when the video, the live video and the live audio are streamed to the dispatcher, the video, the live video and the live audio are further streamed from the dispatcher to one or more first responders.

5. The system according to claim 1, wherein the remote device comprises a specialized device for only sending the code.

6. The system according to claim 1, wherein the one or more cameras associated with the code stream video to the server.

7. A method for generating security alerts for a facility from a remote device, comprising:
- assigning one or more codes to the facility, each code identifying a different location within the facility irrespective of the location of the remote device;
- associating one or more cameras in the facility with each code;
- associating response guidelines with each code;
- receiving the one or more codes from the remote device, the remote device configured for a user to enter one of the one or more codes to identify a location of a security alert in a location in the facility irrespective of the location of the remote device;
- notifying a surveillance center of the location assigned to the one or more codes based on the response guidelines;
- streaming video from the one or more cameras associated with the one or more codes to the surveillance center;
- receiving live video of a visible event and live audio from the remote device, the live video being a video stream separate from the video streamed from the one or more cameras;
- combining the live video and live audio with the video streamed from the one or more cameras;
- routing the combined live video, live audio and video streamed from the one or more cameras through a server to the surveillance center; and
- generating the security alert based on the video stream.

8. The method according to claim 7, wherein the server enables bi-directional communication between the remote device and the surveillance center.

9. The method according to claim 7, further comprising a step of streaming the live video and the live audio from the remote device and the video from the surveillance center to one or both of a dispatcher and an internal responder based on the response guidelines.

10. The method according to claim 9, further comprising a step of streaming the video, the live video and the live audio from the dispatcher to one or more first responders when the video is streamed to the dispatcher.

11. The method according to claim 7, wherein the remote device comprises a specialized device for only sending the codes.

12. The method according to claim 7, further comprising a step of streaming the video from the one or more cameras associated with the code to the server.

13. A non-transitory computer readable storage medium storing a program of instructions executable by a machine to perform a method for generating security alerts for a facility from a remote device, comprising:
- assigning one or more codes to the facility, each code identifying a different location within the facility irrespective of the location of the remote device;
- associating one or more cameras in the facility with each code;
- associating response guidelines with each code;
- receiving the one or more codes from the remote device, the remote device configured for a user to enter one of the one or more codes to identify a location of a security alert in a location in the facility irrespective of the location of the remote device;
- notifying a surveillance center of the location assigned to the one or more codes based on the response guidelines;
- streaming video from the one or more cameras associated with the one or more codes to the surveillance center;
- receiving live video of a visible event and live audio from the remote device, the live video being a video stream separate from the video streamed from the one or more cameras;
- combining the live video and live audio with the video streamed from the one or more cameras;
- routing the combined live video, live audio and video streamed from the one or more cameras through a server to the surveillance center; and
- generating the security alert based on the video stream.

14. The non-transitory computer readable storage medium according to claim 13, wherein the server enables bi-directional communication between the remote device and the surveillance center.

15. The non-transitory computer readable storage medium according to claim 13, further comprising streaming the live video and the live audio from the remote device and the video from the surveillance center to one or both of a dispatcher and an internal responder based on the response guidelines.

16. The non-transitory computer readable storage medium according to claim 15, further comprising streaming the video, the live video and the live audio from the dispatcher to one or more first responders when the video is streamed to the dispatcher.

17. The non-transitory computer readable storage medium according to claim 13, wherein the remote device comprises a specialized device for only sending the codes.

18. The non-transitory computer readable storage medium according to claim 13, further comprising streaming the video from the one or more cameras associated with the code to the server.

19. The system according to claim 1, wherein the location of the remote device is remote from the location of the security alert.

20. The system according to claim 1, wherein the location of the security alert is identified by remotely viewing the one or more cameras in the facility.

21. The system according to claim 1, wherein the remote device is a mobile device.

22. The method according to claim 7, wherein the location of the remote device is remote from the location of the security alert.

23. The method according to claim 7, wherein the location of the security alert is identified by remotely viewing the one or more cameras in the facility.

24. The method according to claim 7, wherein the remote device is a mobile device.

25. The non-transitory computer readable storage medium according to claim 13, wherein the location of the remote mobile device is remote from the location of the security alert.

26. The non-transitory computer readable storage medium according to claim 13, wherein the location of the security alert is identified by remotely viewing the one or more cameras in the facility.

27. The non-transitory computer readable storage medium according to claim 13, wherein the remote device is a mobile device.

\* \* \* \* \*